US008660797B2

(12) United States Patent
Xu et al.

(10) Patent No.: US 8,660,797 B2
(45) Date of Patent: Feb. 25, 2014

(54) METHOD AND SYSTEM OF CALCULATING A FAULT THROW

(75) Inventors: Zitao Xu, Katy, TX (US); Richard L. Chambers, Bixby, OK (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/994,958

(22) PCT Filed: Jan. 5, 2011

(86) PCT No.: PCT/US2011/020157
§ 371 (c)(1),
(2), (4) Date: Jun. 17, 2013

(87) PCT Pub. No.: WO2012/093998
PCT Pub. Date: Jul. 12, 2012

(65) Prior Publication Data
US 2013/0261978 A1    Oct. 3, 2013

(51) Int. Cl.
*G01V 1/40*  (2006.01)
*G01V 3/18*  (2006.01)
*G01V 5/04*  (2006.01)
*G01V 9/00*  (2006.01)

(52) U.S. Cl.
USPC ............................................................... 702/11

(58) Field of Classification Search
USPC ............................................................... 702/11
See application file for complete search history.

(56) References Cited

U.S. PATENT DOCUMENTS

| 5,388,044 | A | * | 2/1995 | Hepp | 702/10 |
| 6,014,343 | A | * | 1/2000 | Graf et al. | 367/38 |
| 2006/0047429 | A1 | * | 3/2006 | Adams | 702/6 |

OTHER PUBLICATIONS

International Search Report and Written Opinion issued Aug. 16, 2011 in International Application No. PCT/US2011/020157 filed Jan. 5, 2011.

* cited by examiner

*Primary Examiner* — John E Breene
*Assistant Examiner* — Manuel Rivera Vargas
(74) *Attorney, Agent, or Firm* — Bradley Misley; Mark E. Scott; Conley Rose, P.C.

(57) ABSTRACT

Calculating a fault throw. At least some embodiments are methods of determining an underground surface or horizon including: identifying an occluded zone residing between a first and second faults, the occluded zone not penetrated by an actual borehole, and the first and second faults intersect an expected location of the surface; calculating a fault throw for the first fault; and calculating the underground surface using the fault throw. Calculating the fault throw may include: calculating a first pseudo depth at a first end of the first fault, the calculating the first pseudo depth using at least one actual depth value that resides across the first fault from the first end; calculating a second pseudo depth at a second end of the first fault, the second end distinct from the first end; and determining the fault throw using the first and second pseudo depths.

24 Claims, 13 Drawing Sheets

_US 8,660,797 B2_

METHOD AND SYSTEM OF CALCULATING A FAULT THROW

CROSS REFERENCE TO RELATED APPLICATION

None.

BACKGROUND

There are many instances in the search for and extraction of underground natural resources where one needs to have a representation of an underground geological boundary or even a topological surface. Even though the descriptions contained herein are to subsurface boundaries, the methodology is applicable to any geological or topological boundary. For example, the layout of the top of a hydrocarbon bearing rock formation may be of interest, the transition between zones of different porosity may be of interest, the transition between zones of different resistivity may be of interest, the transition of any physical or chemical property, or the transition between different formation types may of interest. Creating a mathematical representation of such a boundary is referred to as creating a "surface", or sometimes referred to as creating a "horizon".

Changes in depth or elevation of the geological boundary, such as caused by differential compaction, differential geological uplifting, and broken by faults, make the geological boundary and therefore the representative surface complex. In many cases, creating the surface is based on a limited data set, such as a limited number of actual depth or elevation values from actual boreholes or topological measurements, and known locations of geological faults. Geological faults represent what may be considered a step change in depth or elevation of the geological boundary, and thus faults have always presented difficulties in calculating a surface from a limited data set. In particular, in the related-art when interpolating depth values for the surface along a geological fault, the actual data values that reside across the fault are not used under the theory that data on the opposite side of the fault are not reliable predictions of depth because of the geological fault. Stated otherwise, related-art methods of calculating fault throws do not "look" across the fault for depth values to use in the interpolations.

The related-art rule of not looking across the fault creates difficulty in situations where a geological boundary resides between two geological faults. Because of the faults, and the rule of not looking across a fault for depth data, either no depth data may be available for a particular zone, or depth data may be far removed from the location of the zone such that the calculated depth in the zone between the two geological faults will be significantly higher or lower than could be expected for the actual geological boundary.

Any advance which can be used to more closely estimate the location of an underground geological boundary would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Fault throw" shall mean a change in depth along the intersection of a geological fault with a surface.

"Surface" shall mean a series or array of data comprising depth or elevation values that indicate a location of an underground geological boundary (e.g., the top of a hydrocarbon bearing rock formation, transition between zones of differing porosity, transition between zones of differing resistivity, transition between different formation types).

"Across the . . . fault" shall mean that if the first location (e.g., an end of a fault), a line segment representing the fault, and a second location (e.g., location of an actual depth value) are projected onto a horizontal plane, a straight line segment between the first location and the second location intersects or overlays the line segment representing the fault.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
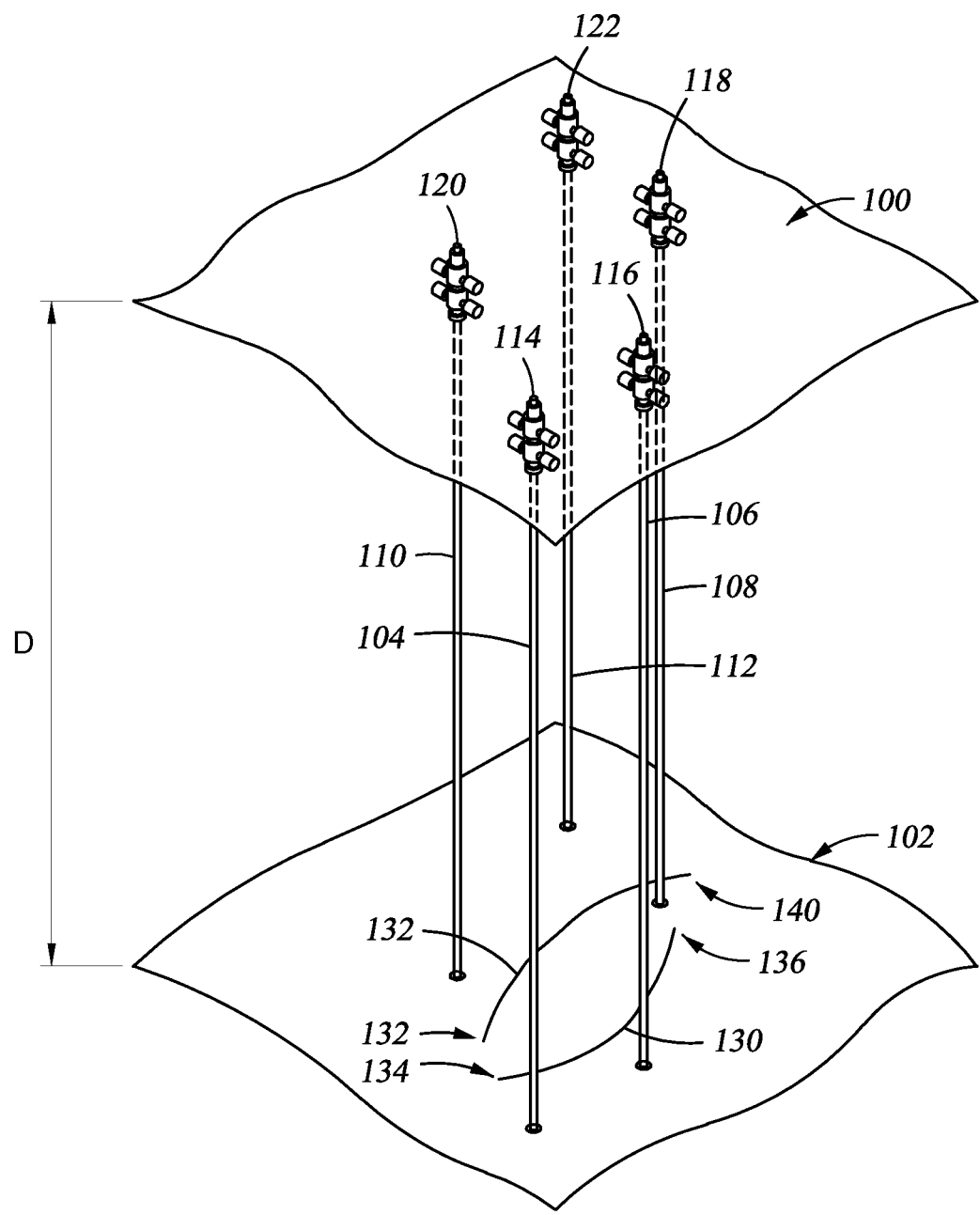
FIG. 1 shows a cutaway perspective view of a portion of the earth that comprises geological boundary of interest.

The various embodiments are directed to methods and related systems of calculating fault throws (i.e., the change in depth of a geological boundary along the intersection of a geological fault with the geological boundary). More particularly, the various embodiments are directed to placement of pseudo wells at the ends of the geological faults such that the fault throw across the geological fault may be calculated. Thereafter, the fault throw may be used, in conjunction with other actual data from actual boreholes, to calculate the surface or horizon representative of the geological boundary. In order to orient the reader, FIG. 1 shows a perspective cutaway view of a portion of the earth. In particular, FIG. 1 shows the earth's face 100 (hereafter "face 100" to avoid confusion with the calculated surfaces) as well as an illustrative underground geological boundary 102. The geological boundary 102 resides at a distance or depth D from the face 100, for example, between 2,000 and 10,000 feet below the surface. The geological boundary 102 will have fluctuations in depth, and the fluctuations are not necessarily shown in FIG. 1. The geological boundary may take any of a variety of forms. For example, the geological boundary 102 may be the top of a hydrocarbon bearing rock formation. The geological boundary 102 may be the transition between zones of differing porosity within an underground formation type. The geological boundary 102 may be the transition between zones of differing resistivity within an underground formation. The geological boundary 102 may be the transition between different formation types. The geological boundary 102 may be the transition between any physical or chemical property of or associated with the rock. Other types of geological boundaries 102 may also be of interest, and thus may be equivalently used. The overburden between the geological boundary 102 and the face 100 is not shown so as not to unduly complicate the figure.

In many cases an estimate of the depth of the geological boundary 102 may be known from measuring techniques such as time-to-depth converted seismic horizons. However, the resolution of seismic data may be on the order of 100 feet or more, and thus may not be of sufficient resolution to be used as a surface (e.g., a surface to which as horizontal or lateral borehole may be drilled). However, the depth of the geological boundary 102 may be precisely known at a plurality of individual locations where actual boreholes have been previously drilled. For example, FIG. 1 shows five illustrative boreholes drilled from the face 100 through the geological boundary 102. In particular, FIG. 1 shows illustrative boreholes 104, 106, 108, 110, and 112. The boreholes are illustrative shown as vertical, but the boreholes may be deviated boreholes, including lateral boreholes. Each of the illustrative boreholes 104, 106, 108, 110, and 112 has a wellhead 114, 116, 118, 120, and 122, respectively. The wellheads may signify that the boreholes have been previously drilled. However, the depth information of the geological boundary 102 may be taken or measured at anytime within a borehole, and thus the illustrative wellheads should not be read as a limitation requiring completed boreholes to provide depth information of the geological boundary 102 at the location of the particular borehole. Thus, while the depth of the geological surface 102 may be loosely known, at the particular locations where each borehole penetrates the geological boundary 102 precise depth information is known (e.g., within several inches, or within several feet).

In many cases a geological boundary 102 may be broken by one or more geological faults, such as geological fault 130 and geological fault 132 shown as respective line segments in FIG. 1. Although the geological faults intersecting a geological boundary 102 may be tectonic in nature, in many cases the faults will be smaller localized faults not necessarily associated with movement of tectonic plates. Because the faults are more localized, in many cases a fault may merely intersect the geological boundary 102. Consider, for example, illustrative fault 130. While the fault 130 may have significant vertical displacement (not shown in FIG. 1), with respect to the geological boundary 102 the fault 130 may reside fully within the geological boundary 102. Stated otherwise, illustrative fault 130 has a first end 134 and a second end 136 that reside within the geological boundary 102. Likewise, illustrative fault 132 has a first end 138 and a second end 140 that reside within the geological boundary 102.

Figure 2:
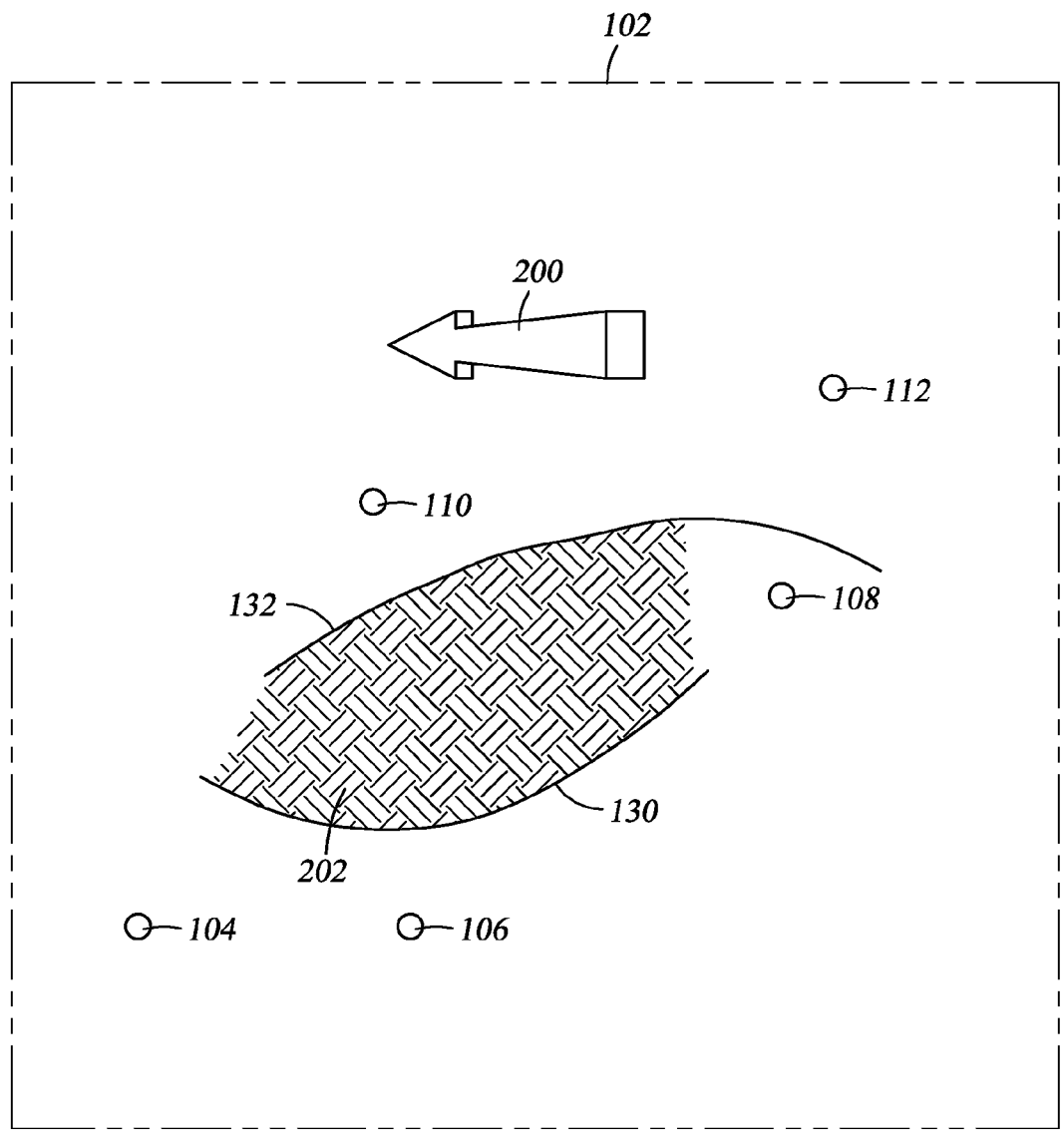
FIG. 2 shows an overhead view of a geological boundary.

FIG. 2 shows an overhead view of the geological surface 102. In particular, FIG. 2 shows the illustrative boreholes 104, 106, 108, 110, and 112. FIG. 1 also shows the illustrative geological faults 130 and 132. For purposes of illustration, consider that the geological boundary 102 slopes from higher elevation (shallower depth) on the right side of the figure to lower elevations (deeper depth) on the left side, and as illustrated by arrow 200.

The relationship of the illustrative fault 130 and 132 present a difficulty when attempting to calculate a surface or horizon corresponding to the geological boundary 102. In particular, the geological fault 130 and geological fault 132 create an occluded zone 202 between the faults through which no actual borehole penetrates, and thus no actual depth information for the occluded zone 202 is known. Using the related-art requirement of not looking across a geological fault for actual depth values when calculating a surface, the only available actual depth is the actual depth associated with the actual borehole 108. Thus, in the related-art, a calculated surface or horizon can use only the actual depth associated with actual borehole 108, as the remaining boreholes are "hidden" by the faults 130 and 132. The result is the depth calculated for the occluded zone 202 will be substantially the same as the depth of the geological boundary 102 at the actual borehole 108. However, in this illustration the geological boundary 102 slopes from the downward from right to left, and thus the ability to use only the depth associated with actual borehole 108 results in an artificially high calculated surface in the occluded zone 202.

Figure 3:
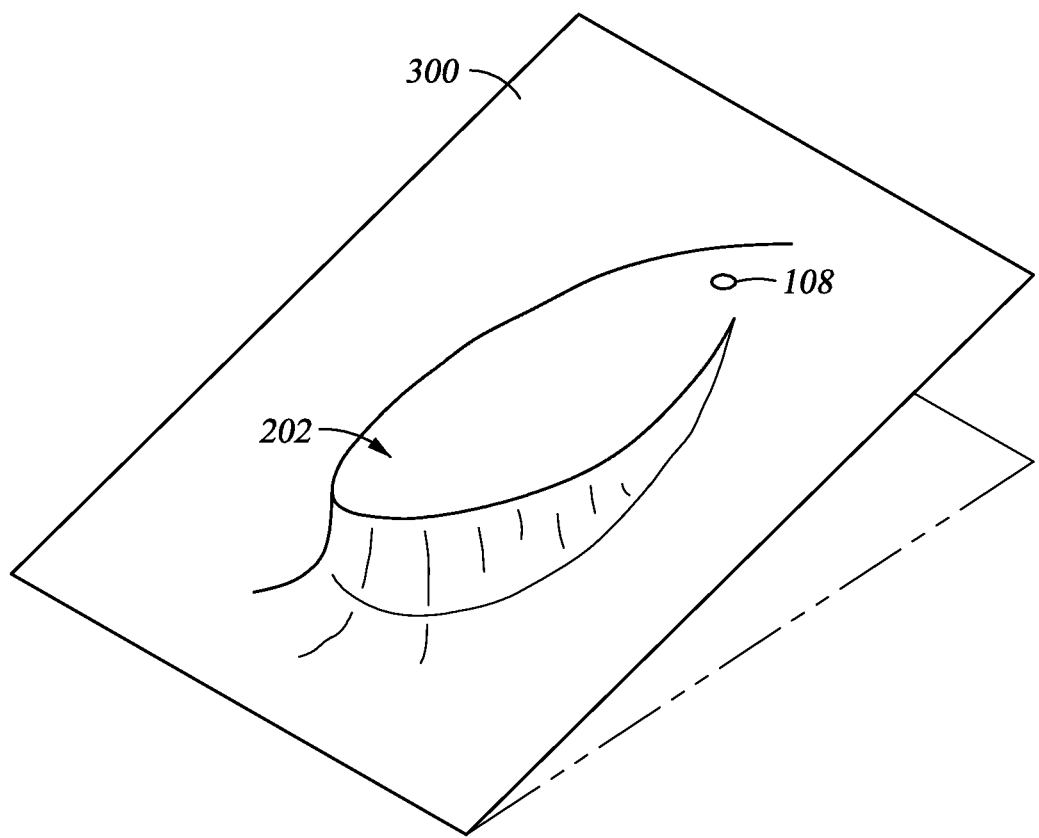
FIG. 3 shows a perspective view of a surface that at least partially corresponds to a geological boundary.

FIG. 3 shows a perspective view of an illustrative surface 300 calculated to represent geological boundary 102 in the situation where a single actual depth at borehole 108 is available to calculate the surface within the occluded zone 202, again in the illustrative situation of the geological boundary sloping significantly from a higher elevation (shallower depth) on the right to a lower elevation (deeper depth) on the left. Because of the single actual depth available for the occluded zone 202 is at the higher elevation, surface interpolation results in an artificially high or shallow surface within the occluded zone 202, known as a "horst" fault block. The problems noted with respect to calculated surfaces within an occluded zone reduced by a method of calculating the fault throw across each of faults, which fault throw may then be used in calculating the surface or horizon corresponding to the geological boundary.

Figure 4:
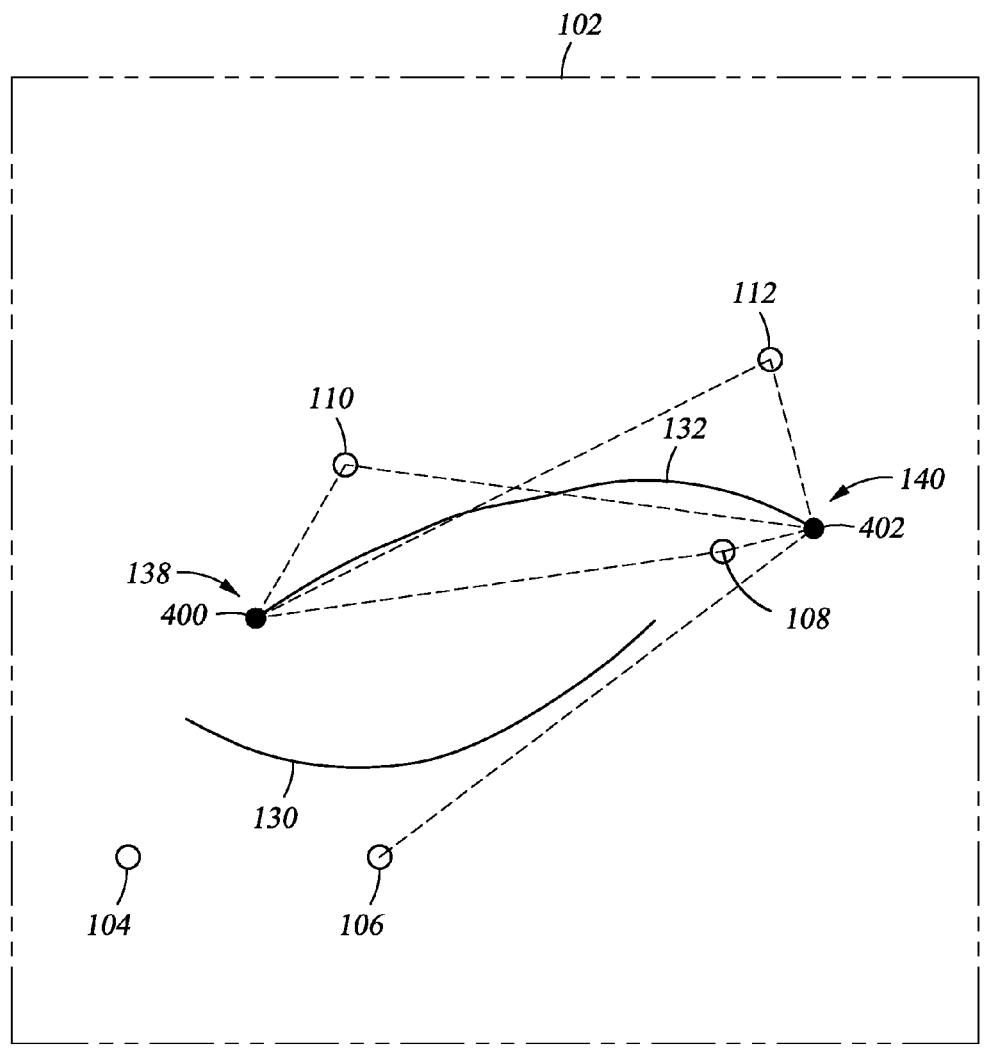
FIG. 4 shows an overhead view of a geological boundary in accordance with at least some embodiments.

FIG. 4 shows an overhead view of the geological boundary 102 in order to explain at least some embodiments. In particular, FIG. 4 shows illustrative faults 130 and 132, along with previously discussed actual boreholes 104, 106, 108, 110, and 112. In accordance with a particular embodiment, in order to calculate a fault throw (i.e., a change in depth along the intersection of the geological fault with the surface), an imaginary or pseudo well is located at each end of the fault. Considering illustrative fault 132, a pseudo well 400 is located at the first end 138 and a pseudo well 402 is located at the second end 140. Pseudo wells 400 and 402 are referred to as "pseudo wells" because no actual borehole resides at the respective locations—the pseudo wells are a mathematical creation. At the pseudo well locations a depth of the geological boundary 102 is calculated using actual depth values from actual boreholes. In a particular embodiment, the actual depths from the actual boreholes used are not only the actual boreholes that the pseudo well can "see" without crossing a geological fault, but also include actual depths from actual boreholes that reside across the fault with which the pseudo well is associated.

First consider pseudo well 400. The actual depth values considered when calculating a depth of the geological boundary 102 at the location of the pseudo well 400 comprise any actual borehole that the pseudo well 400 can "see" by way of a straight line without the straight line crossing a geological fault. For example, actual borehole 110 can be seen by pseudo well 400 as a straight line between pseudo well 400 and actual borehole 110 does not cross a geological fault. Likewise, the actual depth value associated with actual borehole 108 is used in calculating the depth value at pseudo well 400 because a straight line between pseudo well 400 and the actual borehole 108 does not cross a geological fault. However, in a particular embodiment, and contrary to the related-art techniques, the actual depth value associated with actual borehole 112 is also used in calculating a depth of the geological boundary 102 at the pseudo well 400 in spite of the fact that the straight line distance between pseudo well 400 and actual borehole 112 crosses the geological boundary 132. However, in the embodiments illustrated in FIG. 4, the actual depth values associated with actual boreholes 104 and 106 are not used with respect to pseudo well 400 as the straight line distance from the pseudo well 400 to each of the actual boreholes 104 and 108 crosses illustrative geological fault 130.

Now consider pseudo well 402 on the end 140 of the fault 132. The actual depth values from actual boreholes considered when calculating the depth of the geological boundary 102 at the location of the pseudo well 402 comprise actual depth values from boreholes 106, 108, and 112, along with the actual depth value from borehole 110 which resides across the fault 132 from the pseudo well 402. Not included in the illustrated embodiment would be the actual depth value associated with actual borehole 104, as actual borehole 104 is "hidden" by the geological fault 130 in the illustrative case of FIG. 4.

Thus, in accordance with particular embodiments, calculating a depth associated with the geological boundary at the location of a pseudo well includes actual depth values from actual boreholes whose straight line distance to the pseudo well does not cross a fault, and further includes actual depth values from actual boreholes whose straight line distance to the pseudo well reside across the fault at the end of which the pseudo well is located. "Across the fault" means that if the location of a pseudo well (i.e., at the end of a fault), a line segment representing the fault, and the location of an actual borehole are projected onto a horizontal plane, a straight line segment between the location of the pseudo well and the location of the actual borehole intersects or overlays the line segment representing the fault (where the line segment representing the fault is not necessarily straight).

Any suitable interpolation or geostatistical conditional simulation technique may be used in calculating the depth of the geological boundary at the respective pseudo wells 400 and 402. More particularly, in accordance with at least some embodiments an interpolation technique that weighs or takes into account the relative distance between the location of the pseudo wells and the location of each actual borehole is used. In a particular embodiment, the depth of the geological boundary at the pseudo wells 400 and 402 is calculated using Kriging, an interpolation technique known to those of ordinary skill in the art. Once the depth values of the geological boundary 102 at the pseudo well 400 and 402 are determined, the depth values associated with the pseudo wells, as well as the depth values associated with actual boreholes not obscured by another geological fault, may be used to calculate the fault throw along the geological fault 132. That is, the depth values associated with the pseudo well, and actual depth values are used to calculate the change in depth along the intersection of the geological fault with the surface or horizon.

Figure 5:
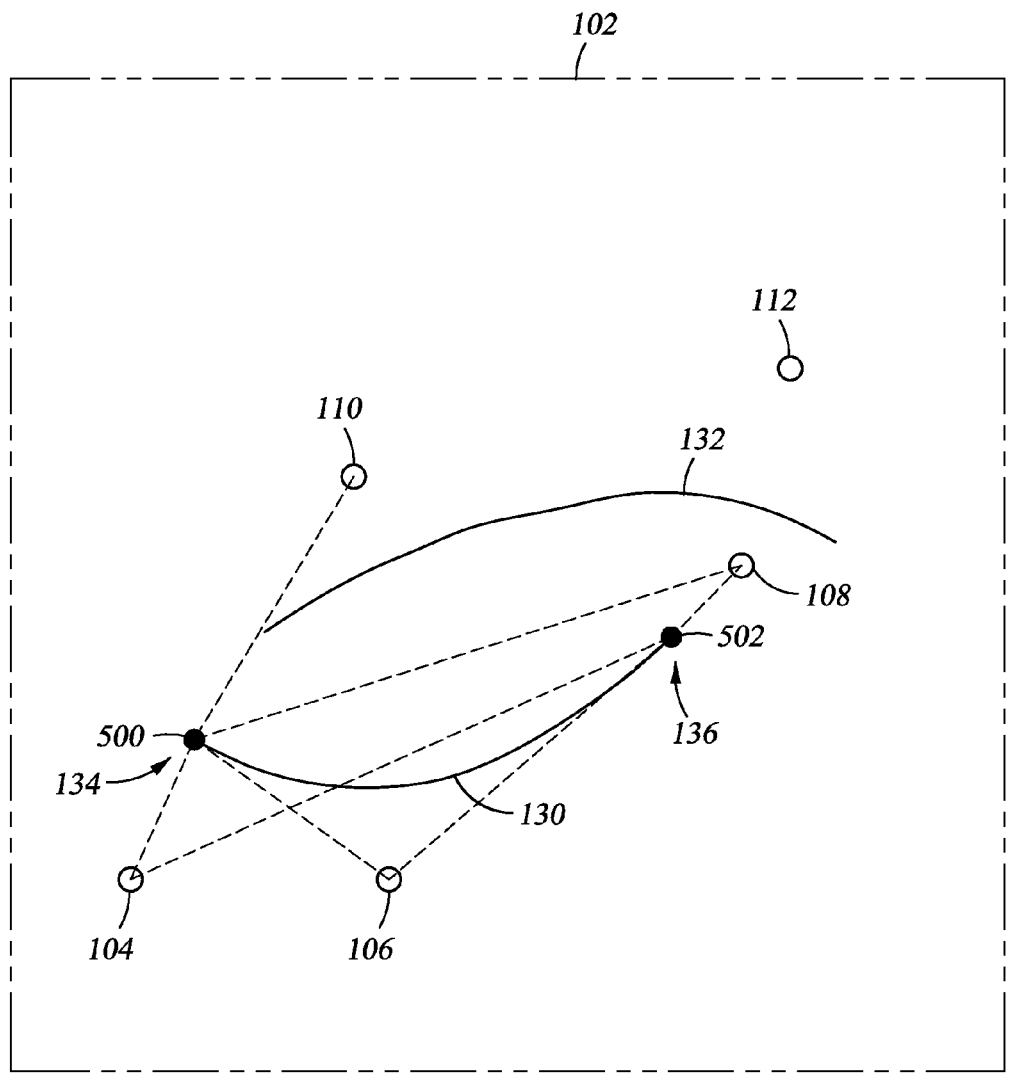
FIG. 5 shows an overhead view of a geological boundary in accordance with at least some embodiments.

FIG. 5 shows an overhead view similar to that of FIG. 4 to discuss calculating the fault throw for illustrative geological fault 130. In particular, in accordance with the various embodiments a pseudo well is logically placed at each end of the geological fault 130. Thus, pseudo well 500 resides at end 134 of fault 130, and pseudo well 502 resides at end 136 of geological fault 130. With respect to pseudo well 500, the actual depth values used to calculate a depth of the geological boundary 102 at the location of pseudo well 500 includes not only actual depth values that can be directly seen by the pseudo well 500 (e.g., actual boreholes 104, 108, and 110), but also actual depth values for actual boreholes that reside across the fault with which the pseudo well is associated (e.g., actual borehole 106). In the illustrated embodiment, the actual depth value associated with actual borehole 112 is not used because actual borehole 112 is obscured by the geological fault 132. Likewise for pseudo well 502, actual depth values for wells that may be seen by the pseudo well 502 (e.g., actual boreholes 106 and 108) as well as actual depth values from actual boreholes that reside across the fault which with the pseudo well 502 is associated (e.g., actual borehole 104) are used to calculate a depth of the geological boundary at the location of pseudo well 502. In the illustrated embodiment, the actual depth values associated with actual boreholes 110 and 112 are not used because actual boreholes 110 and 112 are hidden or obscured by the geological fault 132. Once the depths of the geological boundary are calculated at the respective pseudo well locations, the values associated with the pseudo wells, as well as actual depth values from the actual boreholes, are used to calculate the fault throw along fault 130.

Once the fault throws for geological faults have been calculated, the surface or horizon may be calculated using the actual depth values from the actual boreholes, as well as the fault throws. In at least some embodiments, calculating the surface to represent to the geological boundary 102 does not use the depth values of the geological boundary associated with the pseudo wells (e.g., 400, 402, 500, and 502). That is, while the depths of the geological boundary at the location of the pseudo wells are used to calculate respective fault throws, in at least some embodiments the depths associated with the pseudo wells are not used when calculating the overall surface or horizon. Moreover, in situations such as FIG. 5 where multiple faults exists within the area of interest, pseudo wells, and respective fault throws, for each geological fault may be calculated prior to calculating a surface within the area of interest. Calculating the surface, taking into account the fault throw across the geological faults, may be accomplished by any suitable technique, such as techniques known as "global unfaulting" where an unfaulted surface is calculated, and then the unfaulted space is "faulted" to include discontinuities associated with faults that reside within the space.

Figure 6:
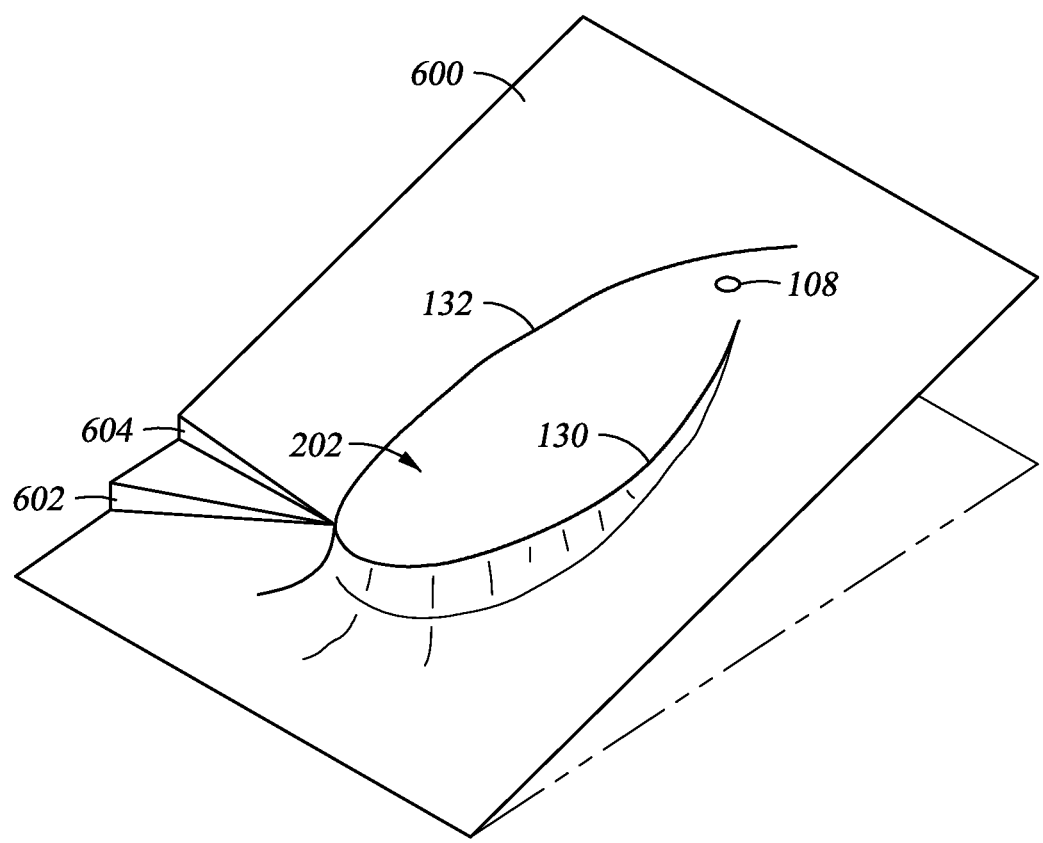
FIG. 6 shows a perspective view of a surface that at least partially corresponds to a geological boundary in accordance with at least some embodiments.

FIG. 6 shows an illustrative portion of a surface 600 including the faults 130 and 132, but where the depth of the surface 600 within the occluded zone 202 is determined using values associated with the fault throws calculated in accordance with the techniques described above. In comparison to FIG. 3, it is seen that the "horst" fault block is significantly less pronounced. Thus, the techniques as described above help produce results for a surface that more accurately represents the underlying geological boundary. However, FIG. 6 also illustrates artifacts 602 and 604. In particular, artifacts 602 and 604 represent step changes in the calculated surface which are highly unlikely to be representative of the geological boundary. The illustrative artifacts 602 and 604 may be due, at least in part, to the binary nature of including or excluding depth values from actual boreholes across faults other than the fault with which the pseudo well is associated. Stated otherwise, the artifact may be present based on the number of data points in the search neighborhood when the depths are interpolated at the grid nodes. The issue is described more fully with respect to FIG. 7.

Figure 7:
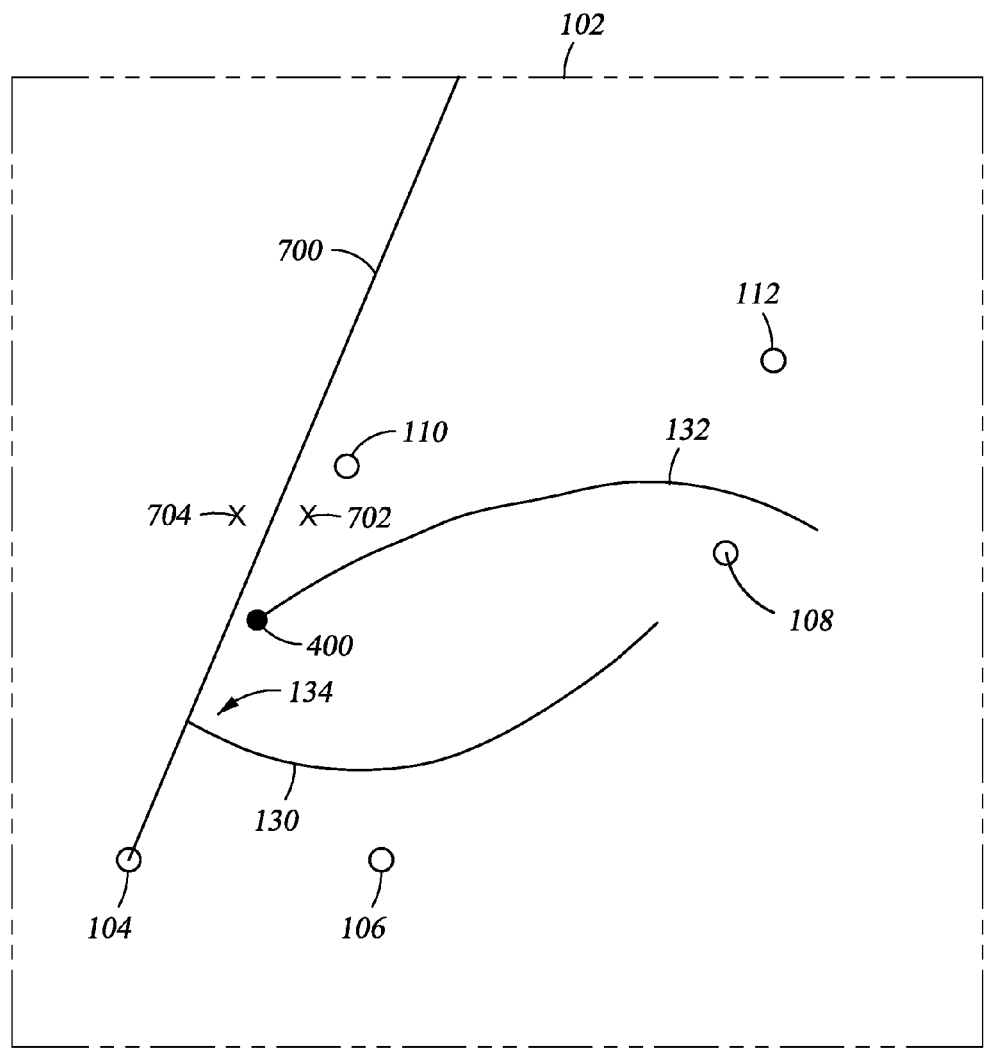
FIG. 7 shows an overhead view of a geological boundary in accordance with at least some embodiments.

FIG. 7 shows an overhead view of the geological boundary 102 in order to discuss artifacts such as shown in FIG. 6. In particular, consider again illustrative pseudo well 400. In calculating the depth of the geological boundary 102 at the location of the pseudo well 400 the actual depths associated with actual boreholes 108, 110, and 112 are used, again because these wells may be seen by the pseudo well 400 either directly or across the fault 132 with which pseudo well 400 is associated. However, the actual depth values associated with actual boreholes 104 and 106 are not included as they are obscured by geological fault 130. Under the assumption that the geological boundary 102 slopes from a higher elevation (shallower depth) on the right to a lower elevation (deeper depth) on the left, the calculated depth of the geological boundary 102 at the location of the pseudo well 400 is highly weighted by actual depths at actual boreholes at the higher elevations. Thus, the calculated depth of the geological boundary at pseudo well 400 may still be artificially high in comparison to the actual geological boundary 102. When calculating or interpolating the surface to correspond to the geological boundary, while the pseudo well 400 and associated depth are not necessarily used, the depth and fault throw associated with fault 132 are used. The result is that the artificially high depth provides, in effect, too much weight to the surface calculation until an actual borehole at a lower elevation becomes visible.

In particular, consider the line 700 associated with actual borehole 104 and the end 134 of fault 130. Surface value interpolations falling to the right side of the line 700 may take into account the actual depth associated with actual borehole 110 and 112, along with the depth and fault throw determined with respect to the fault 132, but such interpolations cannot "see" actual borehole 104, and thus the actual depth associated with actual borehole 104 is not used. However, portions of the interpolated surface to the left side of line 700 can "see" the actual depth associated with actual borehole 104, and the result is a step change in the interpolated surface on the left side of line 700 because of the illustrative lower actual value associated with actual borehole 104. For example, the interpolated depth of the surface at position 702 would take into account the actual depth associated with actual boreholes 110 and 112, along with the actual depth and fault throw calculated with respect to geological fault 132. The interpolated depth at position 702 would not take into account the actual depth associated with actual borehole 104 or actual borehole 106, as those actual boreholes are obscured or masked by the geological fault 130. By contrast, the interpolated depth associated with location 704, just to the left of the line 700, would use all the same values as used to interpolate the depth at position 702, but also the actual depth value associated with actual borehole 104. The additional information thus creates a step change in the elevation or depth of the interpolated surface, and expanding the idea of the step change along the line 700 an artifact is created, such as artifact 604 in FIG. 6.

Figure 8:
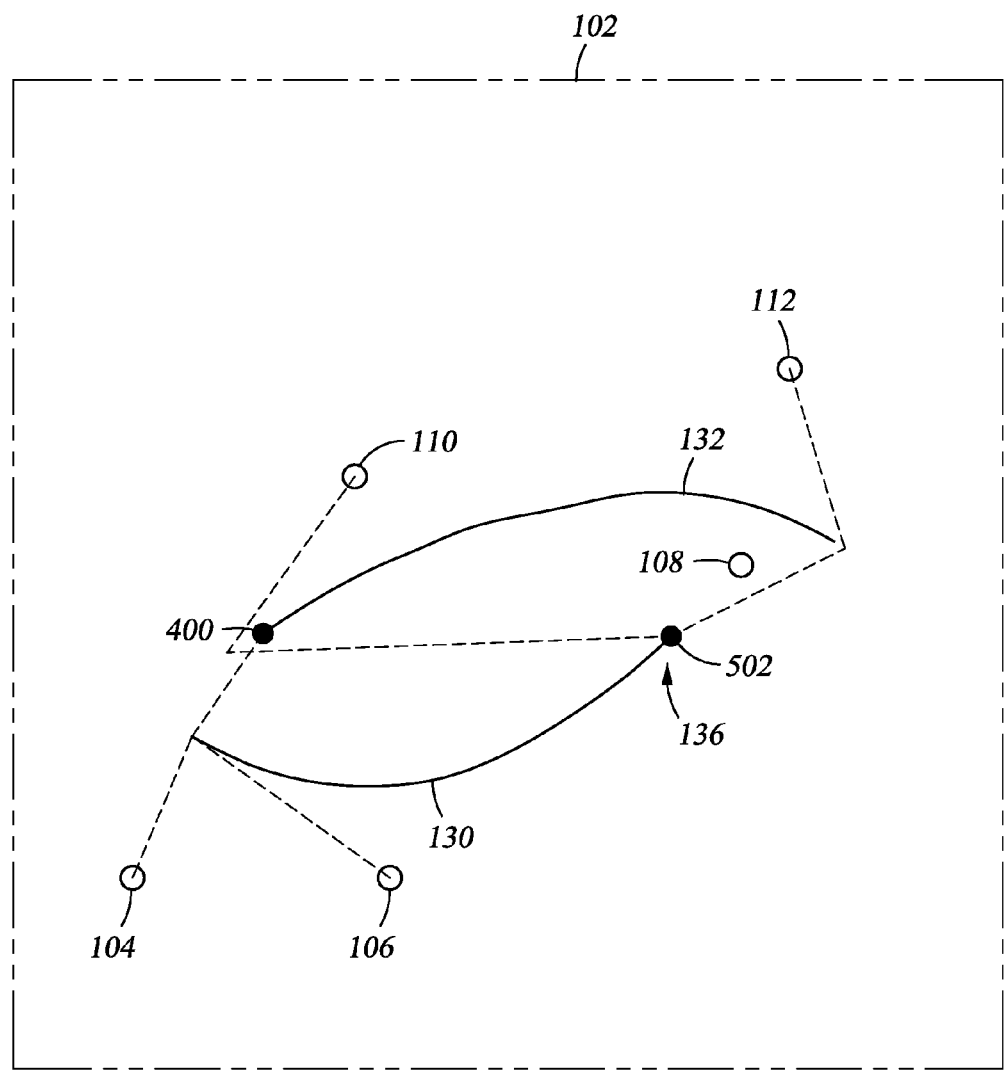
FIG. 8 shows an overhead view of a geological boundary in accordance with at least some embodiments.

In accordance with at least some embodiments, the artifact creation as described with respect to FIG. 7 is reduced by using actual depth values from actual boreholes to calculate a depth of the geological boundary at a pseudo well where at least some of the actual depth values are associated with actual boreholes that reside across a fault not associated with the pseudo well. However, the distance weighting in the interpolation is adjusted for the fact that the actual borehole is otherwise obscured by a non-associated fault. FIG. 8 graphically illustrates embodiments where actual depth values from otherwise obscured actual boreholes are used. In particular, FIG. 8 is an overhead view of the geological boundary 102 similar to FIGS. 4, 5, and 7. First consider illustrative pseudo well 400 associated with geological fault 132. In a particular embodiment, the depth of the geological boundary at the location at the pseudo well 400 is calculated using the actual depths from actual boreholes 108, 110, and 112, as discussed above. Additionally, the actual depth associated with otherwise obscured actual borehole 104 and 106 may also be used in interpolating to determine a depth of the geological boundary of pseudo well 400. However, the distance values used in weighting are based on distances that do not cross the fault that otherwise obscures a straight line distance. For example, a distance value used in weighting the actual depth from actual borehole 104 is the distance between the location of the pseudo well 400 and location of the actual borehole 104 that does not cross the non-associated fault 130. The azimuth used may the true azimuth to the actual borehole 104, the azimuth of the initial direction of the straight line distance around the non-associated fault 130, or an interpolated azimuth between the true azimuth and azimuth of the initial direction of the straight line distance. Likewise, a distance value used in weighting the actual depth from actual borehole 106 is the distance between the location of the pseudo well 400 and location of the actual borehole 106 that does not cross the non-associated fault 130. The azimuth used may the true azimuth to the actual borehole 106, the azimuth of the initial direction of the straight line distance around the non-associated fault 130, or an interpolated azimuth between the true azimuth and azimuth of the initial direction of the straight line distance.

Now consider illustrative pseudo well 502 associated with geological fault 130. The depth of the geological boundary at the location of the pseudo well 502 is calculated using the actual depths from actual boreholes 104, 106, and 108 as discussed above. Additionally, the actual depth associated with otherwise obscured actual boreholes 110 and 112 may also be used in interpolating to determine a depth of the geological boundary of pseudo well 502. However, the distance values used in weighting are based on distances that do not cross the fault that otherwise obscures a straight line distance. For example, a distance value used in weighting the actual depth from actual borehole 110 is the distance between the location of the pseudo well 500 and location of the actual borehole 110 that does not cross the non-associated fault 132. Likewise, a distance value used in weighting the actual depth from actual borehole 112 is the distance between the location of the pseudo well 502 and location of the actual borehole 112 that does not cross the non-associated fault 132. Similar inclusions of otherwise obscured actual boreholes may take place with respect to each pseudo well.

Thus, in accordance with particular embodiments, calculating a depth associated with the geological boundary at the location of a pseudo well includes actual depth values from actual boreholes whose straight line distance to the pseudo well does not cross a fault, actual depth values from actual boreholes whose straight line distance to the pseudo well reside across the fault at the end of which the pseudo well is located, and also includes actual depth values from actual boreholes whose straight line distance crosses a non-associated fault but where a distance used for each actual depth value is a distance around the non-associated geological fault. In the illustrative situation of FIG. 8 where the geological boundary slopes from a higher elevation (shallower depth) on the right to a lower elevation (deeper depth) on the left, the result is that the depth of the geological boundary at each pseudo well takes into account a greater number of actual depths from actual boreholes, and thus are more likely to accurately reflect the depth of the geological boundary. Moreover, the fault throw calculated using such data is more likely to reflect the actual geological boundary 102.

Figure 9:
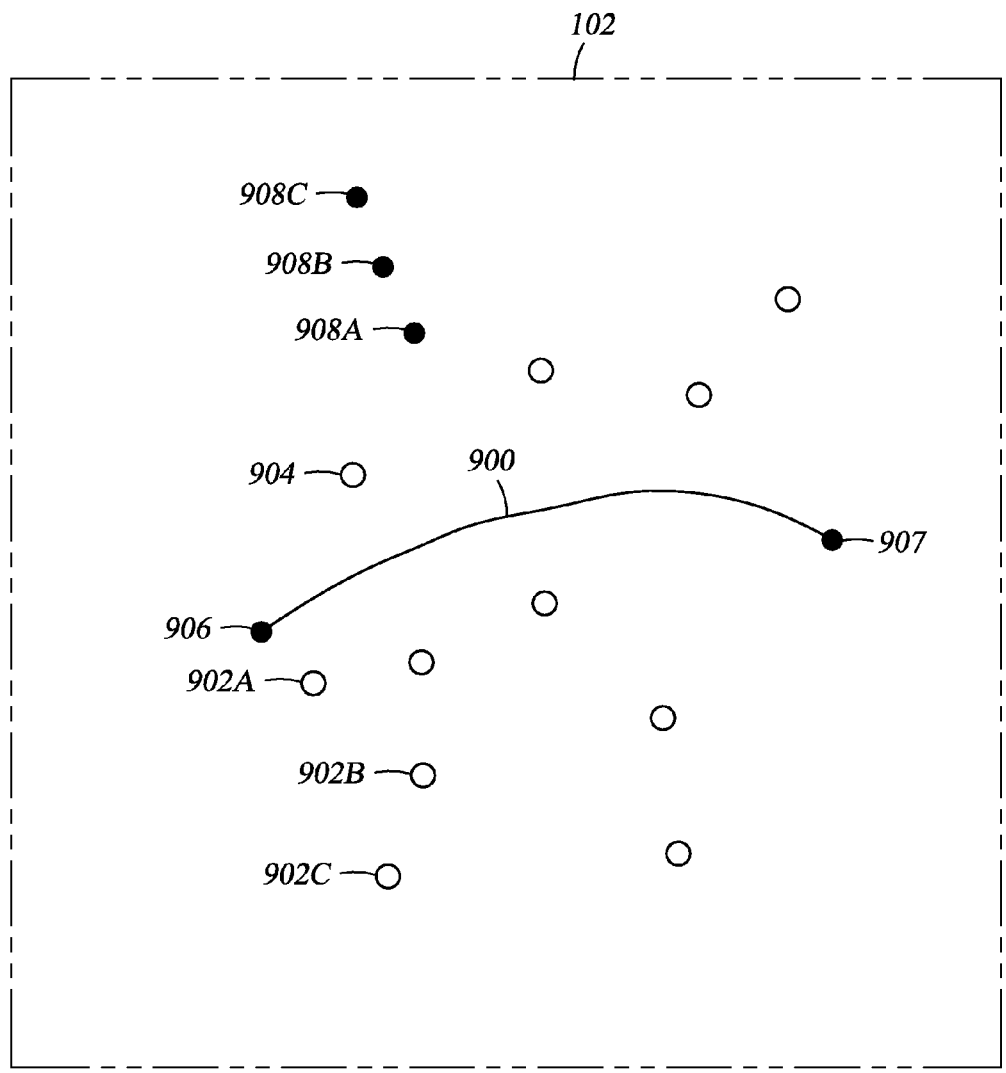
FIG. 9 shows an overhead view of a geological boundary in accordance with at least some embodiments.

FIG. 9 shows an overhead view of a geological boundary comprising a geological fault 900, in order to explain additional topics associated with at least some embodiments. In particular, the overhead view of FIG. 9 includes a plurality of actual boreholes on one side of the geological fault (e.g., boreholes 902A, 902B and 902C), and also shows a plurality of actual boreholes on the opposite side of the geological fault 900 (e.g., actual borehole 904). As illustrated in FIG. 9, it is possible that the actual boreholes on one side of a geological fault may outnumber the actual boreholes on the opposite side of the geological fault. The inventors of the present patent have found that an imbalance as to the number of actual boreholes on opposite sides of the geological fault may in some circumstances result in a calculated fault throw having a reversal. For example, an illustrative pseudo well 906, and an illustrative pseudo well 907, may "see" all the same actual boreholes, and in calculating a fault throw may incorrectly indicate a reversal. Stated otherwise, in situations where the number of actual boreholes are different on opposite sides of the geological fault, the calculated fault throw using the pseudo well techniques discussed above may indicate that a first portion of the fault may be an upthrown and the second portion may be a downthrown. Such a reversal in the fault throw is highly unlikely to exist in nature, and thus unlikely to be representative of the actual geological boundary.

In accordance with at least some embodiments, in situations where the number of actual boreholes used in calculating a pseudo well are imbalanced across the fault, a plurality of additional pseudo wells may be added to correct the deficiency in boreholes on one side of the fault. For example, for the case illustrated in FIG. 9, three additional pseudo wells 908A, 908B, and 908C may be added. In a particular embodiment, the location of the first pseudo well 908A may be the geographical center of the actual boreholes on that side of the geological fault, with additional pseudo wells 908 at any suitable location (e.g., extending in a line away from the geological fault as illustrated by FIG. 9). The depth of the geological boundary associated with each of the pseudo wells 908 may be calculated by interpolation of the actual boreholes 904 on the same side of the geological fault. In a particular embodiment, Kriging is used to determine depth the value of the geological boundary at each pseudo well 908. When the combined number of actual boreholes and pseudo wells on each side of the geological fault are equal, then the process of interpolating depths of the geological boundary at each of the pseudo wells 906 and 907 may continue as discussed above.

Figure 10:
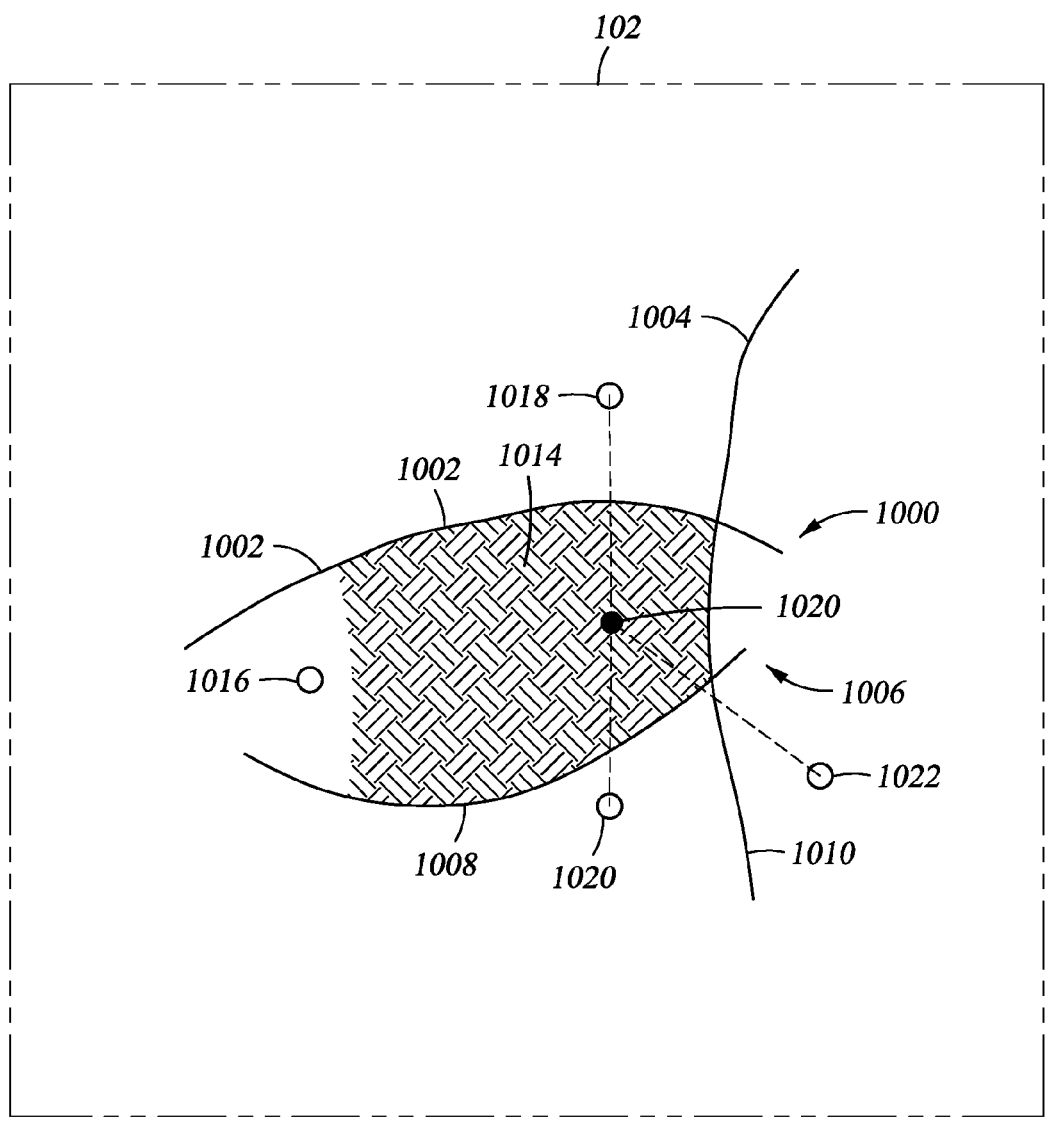
FIG. 10 shows an overhead view of a geological boundary in accordance with at least some embodiments.

FIG. 10 is an overhead view of a geological boundary that may be encountered in some situations. In particular, in the illustrative situation of FIG. 10 intersection of geological faults may result in ambiguity as to which geological fault a particular end point may be associated. For example, the end 1000 could be associated with illustrative geological fault 1002 or illustrative geological fault 1004. Likewise, the end 1006 could be associated with geological fault 1008 or geological fault 1010. The result is an occluded zone 1014 bounded on more than two sides by the various faults. In such illustrative situations, application of the pseudo well technique at the end of each geological fault may be difficult. Thus, in accordance with a particular embodiment, in situations as illustrated by FIG. 10 a pseudo well 1012 may be placed at a location within the occluded zone 1014. A depth of the geological boundary may be calculated at the location of the pseudo well using not only any actual boreholes that can be "seen" by the pseudo well (e.g., actual borehole 1016), but also other actual boreholes that reside across or are otherwise occluded by the various faults (e.g., actual boreholes 1018, 1020, and 1022). In such situations, the distance or weighting parameters for the actual boreholes 1018, 1020, and 1022 may be the direct or straight line distances.

Figure 11:
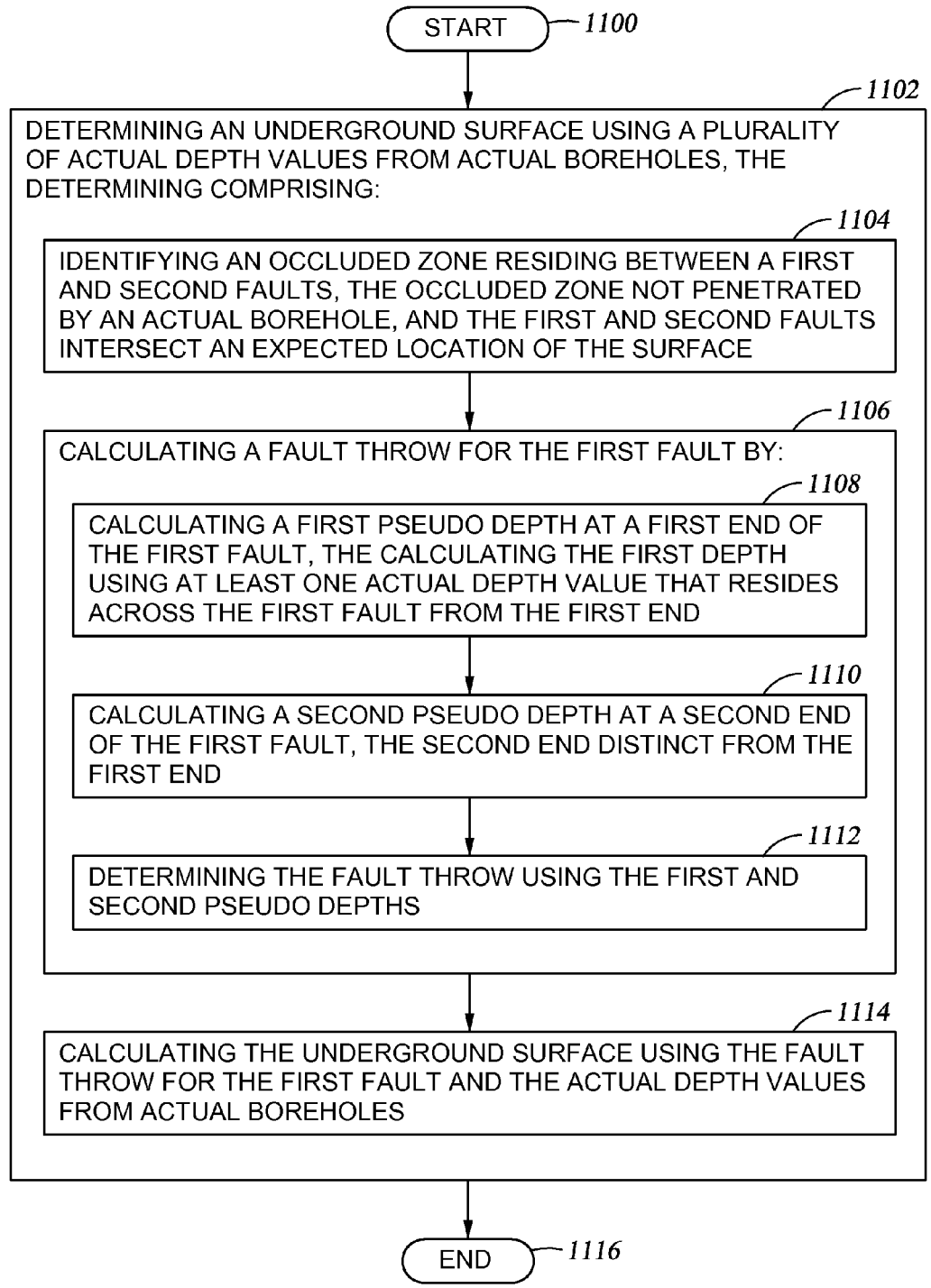
FIG. 11 shows a method in accordance with at least some embodiments.

FIG. 11 illustrates a method in accordance with at least some embodiments. In particular, the method starts (block 1100) and comprises determining an underground surface using a plurality of actual depth values from actual boreholes (block 1102). The determining may comprise: identifying an occluded zone residing between a first and second faults, the occluded zone not penetrated by an actual borehole, and the first and second faults intersect an expected location of the surface (block 1104); calculating a fault throw for the first fault (block 1106); and calculating the underground surface using the fault throw for the first fault and the actual depth values from actual boreholes (block 1114). Calculating the fault throw (block 1106) may comprise: calculating a first pseudo depth at a first end of the first fault, the calculating the first pseudo depth using at least one actual depth value that resides across the first fault from the first end (block 1108); calculating a second pseudo depth at a second end of the first fault, the second end distinct from the first end (block 1110); and determining the fault throw using the first and second pseudo depths (block 1112). Thereafter, the method ends (block 1116).

Figure 12:
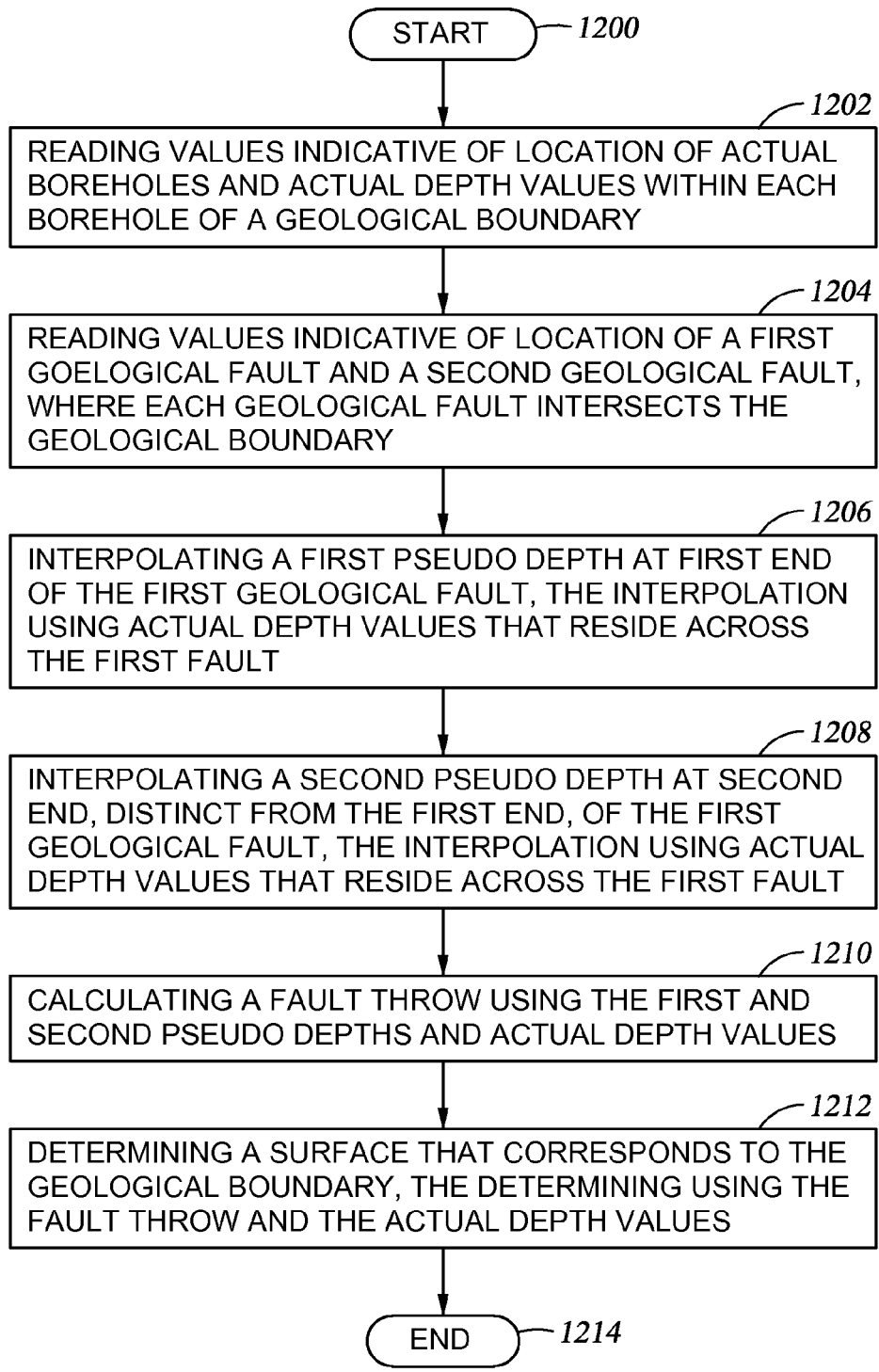
FIG. 12 shows a method in accordance with at least some embodiments.

FIG. 12 shows a method (e.g., that could be implemented as software) in accordance with at least some embodiments. In particular, the method starts (block 1200) and comprises: reading values indicative of location of actual boreholes and actual depth values within each borehole of a geological boundary (block 1202); reading values indicative of location of a first geological fault and a second geological fault, where each geological fault intersects the geological boundary (block 1204); interpolating a first pseudo depth at first end of the first geological fault, the interpolation using actual depth values that reside across the first fault (block 1206); and then interpolating a second pseudo depth at second end, distinct from the first end, of the first geological fault, the interpolation using actual depth values that reside across the first fault (block 1208); and then calculating a fault throw using the first and second pseudo depths and actual depth values (block 1210); and determining a surface that corresponds to the geological boundary, the determining using the fault throw and the actual depth values (block 1212). There after, the method ends (block 1214).

Figure 13:
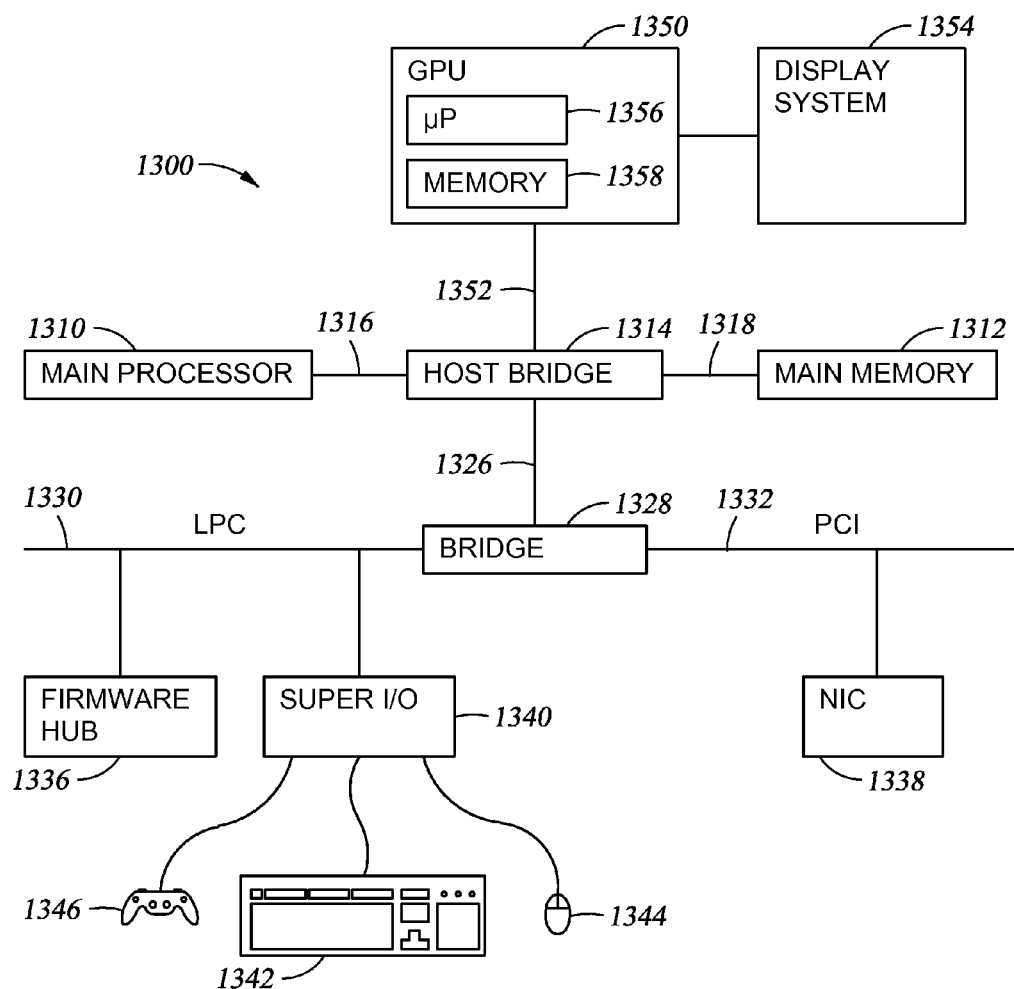
FIG. 13 shows a computer system in accordance with at least some embodiments.

FIG. 13 illustrates a computer system 1300 in accordance with at least some embodiments. In particular, computer system 1300 comprises a main processor 1310 coupled to a main memory array 1312, and various other peripheral computer system components, through integrated host bridge 1314. The main processor 1310 may be a single processor core device, or a processor implementing multiple processor cores. Furthermore, computer system 1300 may implement multiple main processors 1310. The main processor 1310 couples to the host bridge 1314 by way of a host bus 1316 or the host bridge 1314 may be integrated into the main processor 1310. Thus, the computer system 1300 may implement other bus configurations or bus-bridges in addition to, or in place of, those shown in FIG. 13.

The main memory 1312 couples to the host bridge 1314 through a memory bus 1318. Thus, the host bridge 1314 comprises a memory control unit that controls transactions to the main memory 1312 by asserting control signals for memory accesses. In other embodiments, the main processor 1310 directly implements a memory control unit, and the main memory 1312 may couple directly to the main processor 1310. The main memory 1312 functions as the working memory for the main processor 1310 and comprises a memory device or array of memory devices in which programs, instructions and data are stored. The main memory 1312 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 1312 is an example of a non-transitory computer-readable medium storing programs and instructions, and other examples are disk drives and flash memory devices.

The illustrative computer system 1300 also comprises a second bridge 1328 that bridges the primary expansion bus 1326 to various secondary expansion buses, such as a low pin count (LPC) bus 1330 and peripheral components interconnect (PCI) bus 1332. Various other secondary expansion buses may be supported by the bridge device 1328. In accordance with some embodiments, the bridge device 1328 comprises an Input/Output Controller Hub (ICH) manufactured by Intel Corporation, and thus the primary expansion bus 1326 comprises a Hub-link bus, which is a proprietary bus of the Intel Corporation. However, computer system 1300 is not limited to any particular chip set manufacturer, and thus bridge devices and expansion bus protocols from other manufacturers may be equivalently used.

Firmware hub 1336 couples to the bridge device 1328 by way of the LPC bus 1330. The firmware hub 1336 comprises read-only memory (ROM) which contains software programs executable by the main processor 1310. The software programs comprise programs executed during and just after power on self tests (POST) procedures as well as memory reference code. The POST procedures and memory reference code perform various functions within the computer system before control of the computer system is turned over to the operating system.

The computer system 1300 further comprises a network interface card (NIC) 1338 illustratively coupled to the PCI bus 1132. The NIC 1138 acts as to couple the computer system 1300 to a communication network, such the Internet. In some cases, information regarding actual depths within actual boreholes, as well as information regarding location of faults, may be read through the NIC 1338. Further, surfaces or horizons calculated in conformance with one or more embodiments discussed above may be exported to other computer systems over the NIC 1338.

Still referring to FIG. 13, computer system 1300 may further comprise a super input/output (I/O) controller 1340 coupled to the bridge 1328 by way of the LPC bus 1330. The Super I/O controller 1340 controls many computer system functions, for example interfacing with various input and output devices such as a keyboard 1342, a pointing device 1344 (e.g., mouse), game controller 1346, various serial ports, floppy drives and disk drives. The super I/O controller 1340 is often referred to as "super" because of the many I/O functions it performs.

The computer system 1300 further comprises a graphics processing unit (GPU) 1350 coupled to the host bridge 1314 by way of bus 1352, such as a PCI Express (PCI-E) bus or Advanced Graphics Processing (AGP) bus. Other bus systems, including after-developed bus systems, may be equivalently used. Moreover, the graphics processing unit 1350 may alternatively couple to the primary expansion bus 1326, or one of the secondary expansion buses (e.g., PCI bus 1332). The graphics processing unit 1350 couples to a display device 1354 which may comprise any suitable electronic display device or multiple distinct display devices, upon which any image or text can be displayed. The graphics processing unit 1350 comprises an onboard processor 1356, as well as onboard memory 1358. The processor 1356 may thus perform graphics processing (such as displaying surfaces or horizons calculated in conformance with one or more of the embodiments above), as commanded by the main processor 1310. Moreover, the memory 1358 may be significant, on the order of several hundred megabytes or more. Thus, once commanded by the main processor 1310, the graphics processing unit 1350 may perform significant calculations regarding graphics to be displayed on the display system, and ultimately display such graphics, without further input or assistance of the main processor 1310.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than a signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   determining an underground surface using a plurality of actual depth values from actual boreholes, the determining comprising:
   identifying an occluded zone residing between a first and second faults, the occluded zone not penetrated by an actual borehole, and the first and second faults intersect an expected location of the surface;
   calculating a fault throw for the first fault by:
   calculating a first pseudo depth at a first end of the first fault, the calculating the first pseudo depth using at least one actual depth value that resides across the first fault from the first end;
   calculating a second pseudo depth at a second end of the first fault, the second end distinct from the first end; and
   determining the fault throw using the first and second pseudo depths;

calculating the underground surface using the fault throw for the first fault and the actual depth values from actual boreholes.

2. The method of claim 1 wherein calculating the second pseudo depth further comprises calculating the second pseudo depth using at least one actual depth value that resides across the first fault from the second end.

3. The method of claim 2 wherein calculating the second pseudo depth further comprises calculating using actual depth values that do not reside across the second fault.

4. The method of claim 2 wherein calculating the second pseudo depth further comprises using actual depth values that reside across the second fault, and wherein a distance parameter for each actual depth value used is a distance between the second end and the location of the actual depth value that does not cross the second fault.

5. The method of claim 1 wherein determining the fault throw using the first and second pseudo depths further comprises:
  creating at least one pseudo well on a first side of the fault such that a number of actual boreholes and pseudo wells on the first side of the fault is equal to a number of actual boreholes on a second side of the fault; and
  determining the fault throw using the actual boreholes, the pseudo wells and the pseudo depths.

6. The method of claim 5 wherein creating at least one pseudo well further comprises Kriging with respect to a plurality of actual boreholes to create a first pseudo well, the first pseudo well geometrically centered within an area defined by the actual boreholes.

7. The method of claim 1 wherein calculating the first pseudo depth further comprises interpolating the first pseudo depth using a plurality of actual depth values, wherein each actual depth value is weighted in the interpolation based on distance from the first end of the first fault.

8. The method of claim 1 wherein calculating the first pseudo depth further comprises Kriging to obtain the first pseudo depth using a plurality of actual depth values.

9. The method of claim 1 wherein calculating the first pseudo depth further comprises calculating using actual depth values that do not reside across the second fault.

10. The method of claim 1 wherein calculating the first pseudo depth further comprises using actual depth values that reside across the second fault, and wherein a distance parameter for each actual depth value used is a distance between the first end and the location of the actual depth value that does not cross the second fault.

11. A computer system comprising:
  a processor;
  a memory coupled to the processor;
  the memory stores a program that, when executed by the processor, causes the processor to:
    read values indicative of location of actual boreholes and actual depth values within each borehole of a geological boundary;
    read values indicative of location of a first geological fault and a second geological fault, where each geological fault intersects the geological boundary;
    interpolate a first pseudo depth at first end of the first geological fault, the interpolation using actual depth values that reside across the first fault; and then
    interpolate a second pseudo depth at second end, distinct from the first end, of the first geological fault, the interpolation using actual depth values that reside across the first fault; and then
    calculating a fault throw using the first and second pseudo depths and actual depth values; and
    determining a surface that corresponds to the geological boundary, the determining using the fault throw and the actual depth values.

12. The computer system of claim 11 wherein when the processor interpolates the first pseudo depth, the program causes the processor to use actual depth values that do not reside across the second fault.

13. The computer system of claim 12 wherein when the processor interpolates the second pseudo depth, the program causes the processor to use actual depth values that do not reside across the second fault.

14. The computer system of claim 11 wherein when the processor interpolates the first pseudo depth, the program causes the processor to use actual depth values that reside across the second fault, and wherein a distance parameter for each actual depth value used is a distance between the first end and the location of the actual depth value that does not cross the second fault.

15. The computer system of claim 14 wherein when the processor interpolates the second pseudo depth, the program causes the processor to use actual depth values that reside across the second fault, and wherein a distance parameter for each actual depth value used is a distance between the second end and the location of the actual depth value that does not cross the second fault.

16. The computer system of claim 11 wherein when the processor interpolates the first pseudo depth, the program causes the processor to interpolate the first pseudo depth using a plurality of actual depth values, wherein each actual depth value is weighted in the interpolation based on distance from the first end of the first fault.

17. The computer system of claim 11 wherein when the processor interpolates the first pseudo depth, the program causes the processor to perform Kriging to obtain the first pseudo depth using a plurality of actual depth values.

18. The computer system of claim 11 wherein when the processor calculates the fault throw the program causes the processor to:
  create at least one pseudo well on a first side of the fault such that a number of actual boreholes and pseudo wells on the first side of the fault is equal to a number of actual boreholes on a second side of the fault; and
  calculate the fault throw using the actual boreholes, the pseudo wells and the pseudo depths.

19. A non-transitory computer-readable medium storing a program that, when executed by a processor, causes the processor to:
  read values indicative of location of actual boreholes and actual depth values within each borehole of a geological boundary;
  read values indicative of location of a first geological fault and a second geological fault, where each geological fault intersects the geological boundary;
  interpolate a first pseudo depth at first end of the first geological fault, the interpolation using actual depth values that reside across the first fault; and then
  interpolate a second pseudo depth at second end, distinct from the first end, of the first geological fault, the interpolation using actual depth values that reside across the first fault; and then
  calculate a fault throw using the first and second pseudo depths and actual depth values; and
  determine a surface that corresponds to the geological boundary, the determining using the fault throw and the actual depth values.

20. The non-transitory computer-readable medium of claim 19 wherein when the processor interpolates the first pseudo depth, the program causes the processor to use actual depth values that do not reside across the second fault.

21. The non-transitory computer-readable medium of claim 20 wherein when the processor interpolates the second pseudo depth, the program causes the processor to use actual depth values that do not reside across the second fault.

22. The non-transitory computer-readable medium of claim 19 wherein when the processor interpolates the first pseudo depth, the program causes the processor to perform Kriging to obtain the first pseudo depth using a plurality of actual depth values.

23. The non-transitory computer-readable medium of claim 19 wherein when the processor interpolates the first pseudo depth, the program causes the processor to use actual depth values that reside across the second fault, and wherein a distance parameter for each actual depth value used is a distance between the first end and the location of the actual depth value that does not cross the second fault.

24. The non-transitory computer-readable medium of claim 19 wherein when the processor calculates the fault throw the program causes the processor to:
   create at least one pseudo well on a first side of the fault such that a number of actual boreholes and pseudo wells on the first side of the fault is equal to a number of actual boreholes on a second side of the fault; and
   calculate the fault throw using the actual boreholes, the pseudo wells and the pseudo depths.

* * * * *